(12) United States Patent
Kadu

(10) Patent No.: US 12,621,245 B2
(45) Date of Patent: *May 5, 2026

(54) CENTRALIZED AGGREGATED ELEPHANT FLOW DETECTION AND MANAGEMENT

(71) Applicant: Avago Technologies International Sales Pte. Limited, Singapore (SG)

(72) Inventor: Sachin Prabhakarrao Kadu, Fremont, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 60 days.

This patent is subject to a terminal disclaimer.

(21) Appl. No.: 18/457,058

(22) Filed: Aug. 28, 2023

(65) Prior Publication Data

US 2023/0412515 A1 Dec. 21, 2023

Related U.S. Application Data

(63) Continuation of application No. 17/475,297, filed on Sep. 14, 2021, now Pat. No. 11,784,935.

(51) Int. Cl.
| | |
|---|---|
| *H04L 47/2483* | (2022.01) |
| *H04L 45/24* | (2022.01) |
| *H04L 47/6275* | (2022.01) |
| *H04L 49/109* | (2022.01) |

(52) U.S. Cl.
CPC .......... *H04L 47/2483* (2013.01); *H04L 45/24* (2013.01); *H04L 47/6275* (2013.01); *H04L 49/109* (2013.01)

(58) Field of Classification Search
None
See application file for complete search history.

(56) References Cited

U.S. PATENT DOCUMENTS

| | | | |
|---|---|---|---|
| 7,286,566 B1 | 10/2007 | Parruck et al. | |
| 10,778,588 B1 | 9/2020 | Singh | |
| 11,323,358 B1 | 5/2022 | Kadu | |
| 11,784,935 B2 * | 10/2023 | Kadu ..................... | H04L 45/24 370/236 |
| 2015/0120959 A1 * | 4/2015 | Bennett ................. | H04L 47/10 709/233 |
| 2015/0163144 A1 * | 6/2015 | Koponen ............. | H04L 49/252 370/237 |
| 2015/0312117 A1 * | 10/2015 | Behera ................. | H04L 43/062 370/241 |
| 2016/0285771 A1 * | 9/2016 | Kulkarni ............. | H04L 47/2483 |
| 2018/0048571 A1 * | 2/2018 | Dharmapurikar ...... | H03M 13/11 |
| 2018/0205624 A1 * | 7/2018 | Rai ....................... | H04L 43/062 |

(Continued)

OTHER PUBLICATIONS

Extended European Search Report from European Patent Application No. 22194378.0, dated Jan. 3, 2023, 9 pages.

(Continued)

*Primary Examiner* — Anh Vu H Ly
(74) *Attorney, Agent, or Firm* — Foley & Lardner LLP

(57) ABSTRACT

A semiconductor chip for implementing aggregated flow detection and management includes a number of pipes, where each pipe is coupled to a portion of ports on the semiconductor chip that are to receive data packets. A logic is coupled to the pipes and is used to detect and manage an elephant flow. The elephant flow-detection and management logic includes a flow table and a byte counter.

23 Claims, 7 Drawing Sheets

300

(56)         References Cited

U.S. PATENT DOCUMENTS

| | | |
|---|---|---|
| 2019/0190838 A1 | 6/2019 | Shpiner et al. |
| 2019/0253362 A1 | 8/2019 | Ruthstein et al. |
| 2019/0273690 A1* | 9/2019 | Akahane ................. H04L 47/16 |
| 2019/0356593 A1 | 11/2019 | Nikolaidis et al. |
| 2020/0136983 A1 | 4/2020 | Ghanwani et al. |
| 2020/0287833 A1 | 9/2020 | Bottorff et al. |
| 2022/0360506 A1 | 11/2022 | Labonte et al. |
| 2023/0082780 A1* | 3/2023 | Sun ......................... G06F 9/505 |
| | | 718/105 |

OTHER PUBLICATIONS

Notice of Allowance on U.S. Appl. No. 17/475,297 dtd May 30, 2023.
Tong, et al., "High Throughput Hierarchical Heavy Hitter Detection in Data Streams," 2015 IEEE 22nd International Conference on High Performance Computing, 2015, pp. 224-233.
US Office Action on US dtd Jan. 3, 2023.

\* cited by examiner

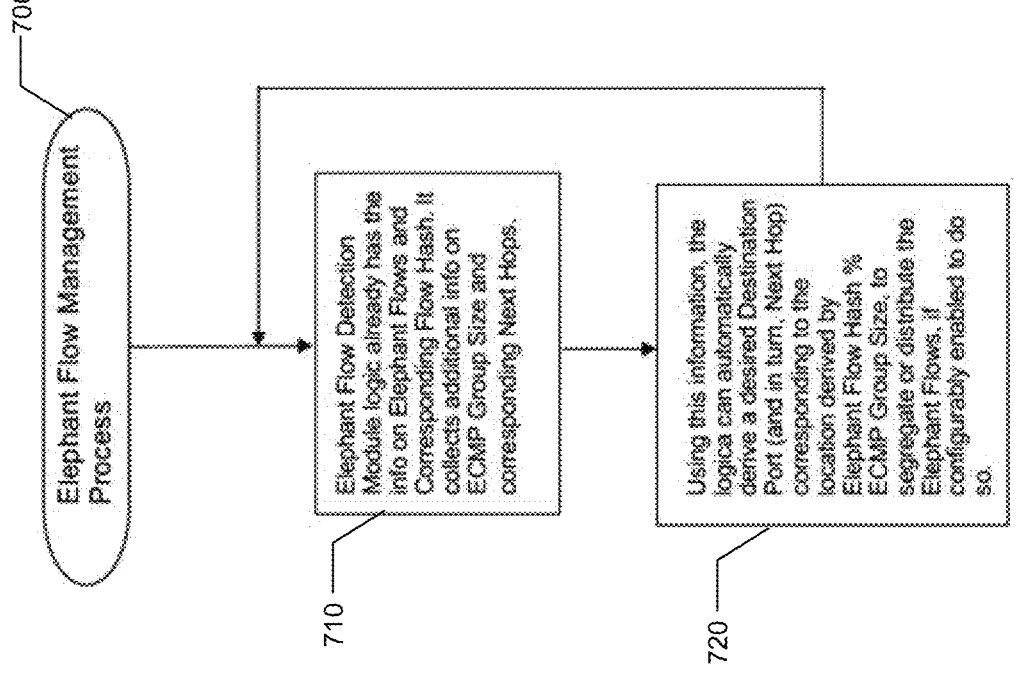

700

Elephant Flow Management Process

710

Elephant Flow Detection Module logic already has the info on Elephant Flows and Corresponding Flow Hash. It collects additional info on ECMP Group Size and corresponding Next Hops.

720

Using this information, the logica can automatically derive a desired Destination Port (and in turn, Next Hop) corresponding to the location derived by Elephant Flow Hash % ECMP Group Size, to segregate or distribute the Elephant Flows, if configurably enabled to do so.

FIG. 7

CENTRALIZED AGGREGATED ELEPHANT FLOW DETECTION AND MANAGEMENT

CROSS-REFERENCE TO RELATED APPLICATIONS

This application is a continuation of U.S. patent application Ser. No. 17/475,297, filed Sep. 14, 2021, the entire disclosure of which has been incorporated by reference herein.

TECHNICAL FIELD

The present description relates generally to Ethernet communications and, in particular, to centralized aggregated elephant flow detection and management.

BACKGROUND

There are a small number of flows that carry the majority of internet traffic and a large number of flows that carry comparatively very little internet traffic. The flows that carry the large amount of internet traffic and consume the routing resources at a much higher rate over a network link are called elephant flows. Elephant flows significantly influence the flow of internet traffic through the networks by causing packet drops and increasing latencies. Effective detection, analysis and management of these flows can help reduce congestion, packet drops and tail latencies. The existing implementations cannot analyze and detect flows across multiple pipes when a flow changes ingress port (for various reasons such as load balancing, the port is down for maintenance, etc.), and when it falls on a different processing pipe. The cost of implementation is replicated per pipe and can be significant, in terms of chip area and power consumption, for devices having 16 or 32 pipes. In other words, the existing solutions do not support aggregation across multiple pipes, and their elephant flow detection is based only on the number of bytes in a given flow and not on the corresponding egress queues/port loading and/or congestion. Further, all the accounting is done only on a start-of-packet (SOP), thus limiting the support to only the flows, which has data packet byte count information available at the SOP.

BRIEF DESCRIPTION OF THE DRAWINGS

Certain features of the subject technology are set forth in the appended claims. However, for purposes of explanation, several embodiments of the subject technology are set forth in the following figures.

FIG. 7 is a flow diagram illustrating an example of an elephant-flow management process, in accordance with some aspects of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description, which includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

The subject technology is directed to methods and systems for centralized elephant flow detection and management. In communication networks, elephant flow refers to an extremely large flow of data through a network link that can occupy a disproportionate share (e.g., more than 1%) of the total bandwidth over a period of time. Elephant flows can significantly influence the internet traffic through the network links by causing packet drops and increasing latencies, and can consume routing resources at a much higher rate over a network link.

The subject technology can detect, analyze and manage elephant flows in order to reduce traffic congestion, packet drops, and tail latencies. For every data packet going through, each pipe can provide information related to a number of subjects to a central elephant flow-detection module, as described in more detail herein.

The detected elephant flows are reported to enable changes to their quality of service. The detected elephant flows can also be segregated or distributed across the desired paths using the load-aware ECMP structure. The load-aware ECMP structure can dynamically map for modified paths through network routers using a central state machine, as described in the U.S. patent application Ser. No. 17/230,940 filed on Apr. 14, 2021, which is incorporated by reference herein.

The disclosed solution has a number of advantageous features. For example, using the disclosed technology, the elephant flow detection and management logic is implemented only once, irrespective of the number of pipes on a semiconductor chip (hereinafter, chip), which results in a fraction of the cost of the existing implementations. Also, the disclosed solution aggregates across all pipes of the chip and is agnostic to the flows changing ingress ports on a given router. Further, the elephant flow-detection and management logic of the subject technology is supported for any protocol irrespective of whether data packet lengths are available at SOP or not, and can be enabled to track the flow hash (e.g., a 16-bit flow hash) only if the corresponding egress port is congested and/or loaded to a certain threshold within a time interval threshold.

Figure 1:
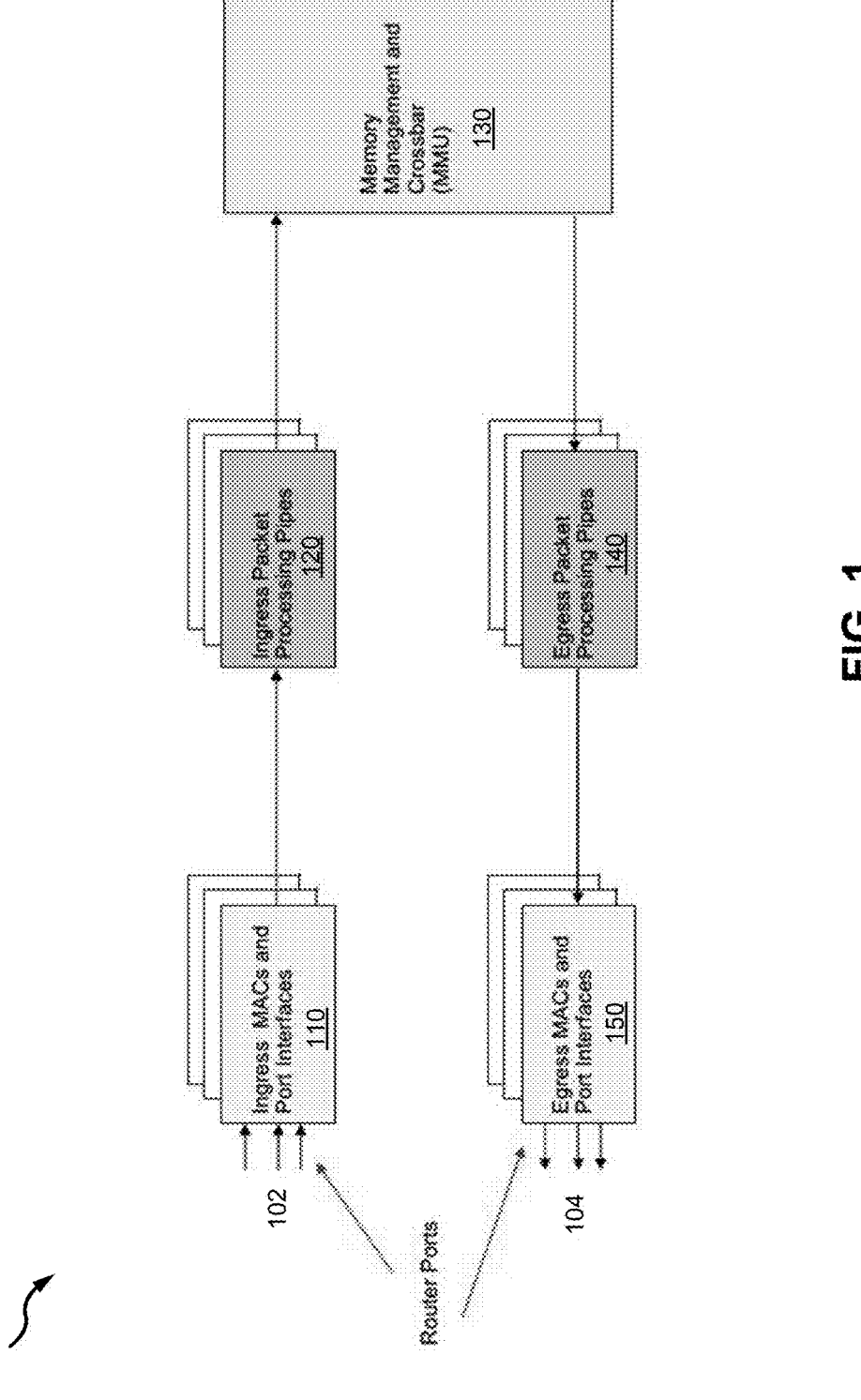
FIG. 1 is a block diagram illustrating an example of a switch and/or router chip within which the centralized aggregated elephant flow detection and management of the subject technology is implemented.

FIG. 1 is a block diagram illustrating an example of a switch/router chip 100 within which the centralized aggregated elephant flow detection and management logic of the subject technology is implemented. The example switch/router chip 100 includes blocks 110, which comprise multiple ingress medium-access control (MAC) layers and port interfaces (hereinafter, ingress MAC and interface blocks 110), a number of ingress packet processing pipes 120, a memory management and crossbar unit 130, several egress packet processing pipes 140 and a number of egress MACs and port interfaces 150 (hereinafter, egress MAC and interface blocks 150). Each port interface of the ingress MAC and interface blocks 110 is connected to an input (ingress) port of the input ports 102 and receives input data to be passed to a MAC layer. The MAC layer can perform known functions such as frame delimiting and recognition, addressing of destination stations, conveyance of source-station addressing information, transparent data transfer of information in the Ethernet sublayer, protection against errors and control of access to the physical transmission medium. The ingress packet processing pipes 120 can include several processing pipes, each connected to a MAC layer of the ingress MAC and interface blocks 110 and to the memory management and crossbar unit 130. In some implementations, the flow detection and management of the subject technology can be implemented only once, irrespective of the number of pipes on the chip, for example, within the memory management and crossbar unit 130. In other implementations, the flow detection and management of the subject technology can replace the memory management and crossbar unit 130. The output packets from the memory management and crossbar unit 130 are processed by the egress packet processing pipes 140 and are passed through the egress MAC and interface blocks 150 to the output ports 104.

Figure 2:
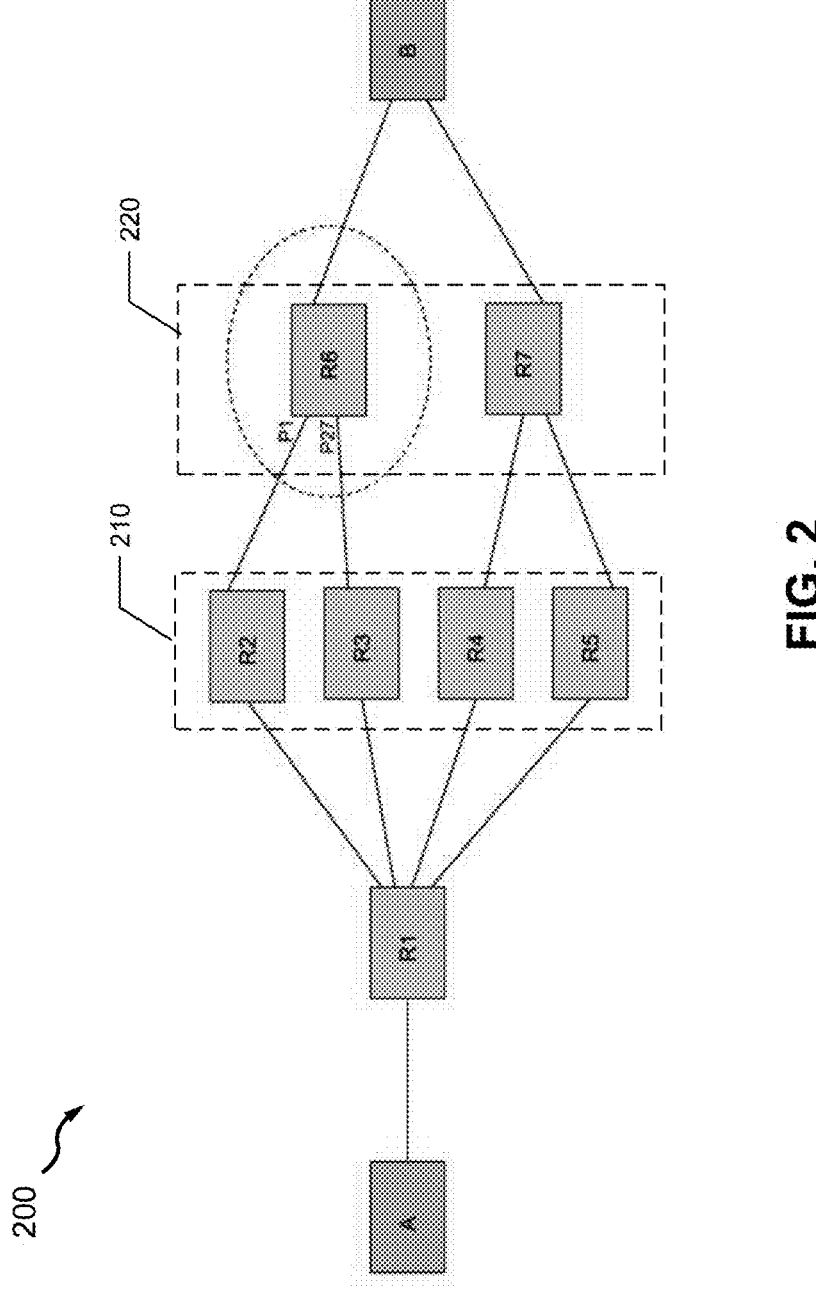
FIG. 2 is a block diagram illustrating limiting aspects of an example of an existing elephant-flow detection system.

FIG. 2 is a block diagram illustrating limiting aspects of an example of an existing elephant-flow detection system 200. In the existing elephant-flow detection system 200, a first host A (e.g., located in San Jose, California) is connected to a first router R1, which in turn is connected through to routers R2, R3, R4 and R5. The routers R2 and R3 are connected to ports P1 and P27 of a router R6, and the routers R4 and R5 are connected to a router R7. The routers R6 and R7 are connected to a second host B (e.g., located in Seattle, Washington). The routers contain info on port and/or queue loading for their own ports only. For a scenario where the flow from the host A to the host B passes through the path consisting of routers R1, R2 and R6, the port P1 of the router R6 falls within a pipe 0 of the router R6, which may include 16 pipes each having, for example, 16 ports (e.g., P1 through P16). Therefore, an elephant flow-detection and management logic associated with port 0 of the router R6 would analyze the flow in the router R6. In another scenario, if for some reason the flow from the host A changes path and continues through routers R1, R3, R6 to the host B, then the elephant flow-detection and management logic in the pipe 0 of the router R6 will not be able to see that flow any longer because the port 27 falls within a pipe 2 of the router R6. Therefore, the pipe 0 will not be able to detect that flow, which shows a limitation of the existing elephant-flow detection method.

Figure 3:
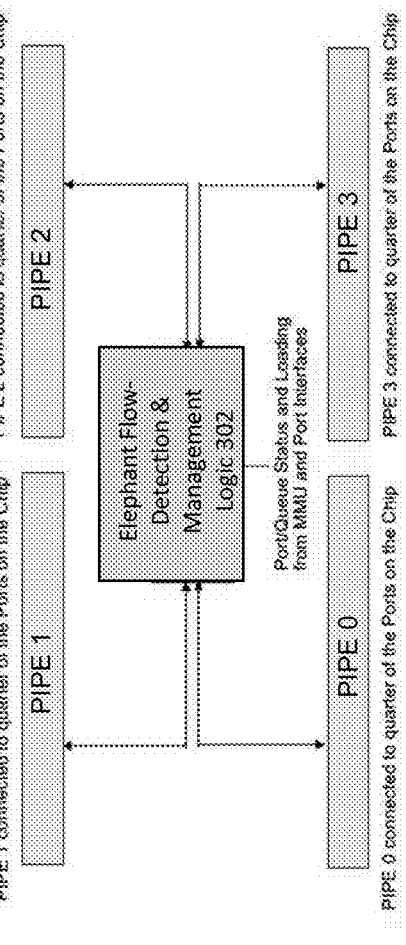
FIG. 3 is a high-level block diagram illustrating an example of an aggregated elephant-flow detection system, according to various aspects of the subject technology.

FIG. 3 is a high-level block diagram illustrating an example of an aggregated elephant-flow detection system 300, according to various aspects of the subject technology. The example aggregated elephant-flow detection system 300 includes, but is not limited to, four pipes—pipe 0, pipe 1, pipe 2 and pipe 3—which are implemented on a semiconductor chip. Each of pipe 0, pipe 1, pipe 2 and pipe 3 is connected to a quarter of the ports on the semiconductor chip, for example, to a first quarter, second quarter, third quarter and a fourth quarter of the ports, respectively. A central elephant flow-detection and management logic 302 is connected to the pipes (pipe 0, pipe 1, pipe 2 and pipe 3) and receives status and loading information from the port interfaces (e.g., of ingress MAC and interface blocks 110 of FIG. 1) and an MMU (e.g., 130 of FIG. 1). The central elephant flow-detection and management logic 302 uses the information received from the port interfaces and the MMU to analyze and manage elephant flows in order to reduce traffic congestion, packet drops, and tail latencies. For every data packet passing through one or more of pipe 0, pipe 1, pipe 2 and pipe 3, each of the pipes can provide information related to a number of subjects to the central elephant flow-detection and management logic 302. The information may, for example, relate to flow (e.g., five-tuple), ingress port, egress port, and/or the number of bytes in the data packet at an end of packet (EOP), which are tracked across the chip by an elephant flow-detection logic.

In some implementations, each pipe (pipe 0, pipe 1, pipe 2 and pipe 3) can also compare accumulated byte count, per flow, against configurable byte-count and time-period thresholds to detect elephant flows, report the detected elephant flows and support aging of the detected elephant flows with configurable intervals. In one or more implementations, the elephant flow-detection and management logic 302 is supported for any protocol irrespective of whether data packet lengths are available at SOP and can be enabled to track the flow hash (e.g., a 16-bit flow hash) only if the corresponding egress port is congested and/or loaded to a certain threshold within a time interval threshold. In some implementations, each pipe can report the detected elephant flow to software using first-in-first-out (FIFO) direct memory access (DMA), and may leverage the tracked flow hash to segregate or distribute the detected elephant flow using a load-aware ECMP structure.

Figures 4, 5:
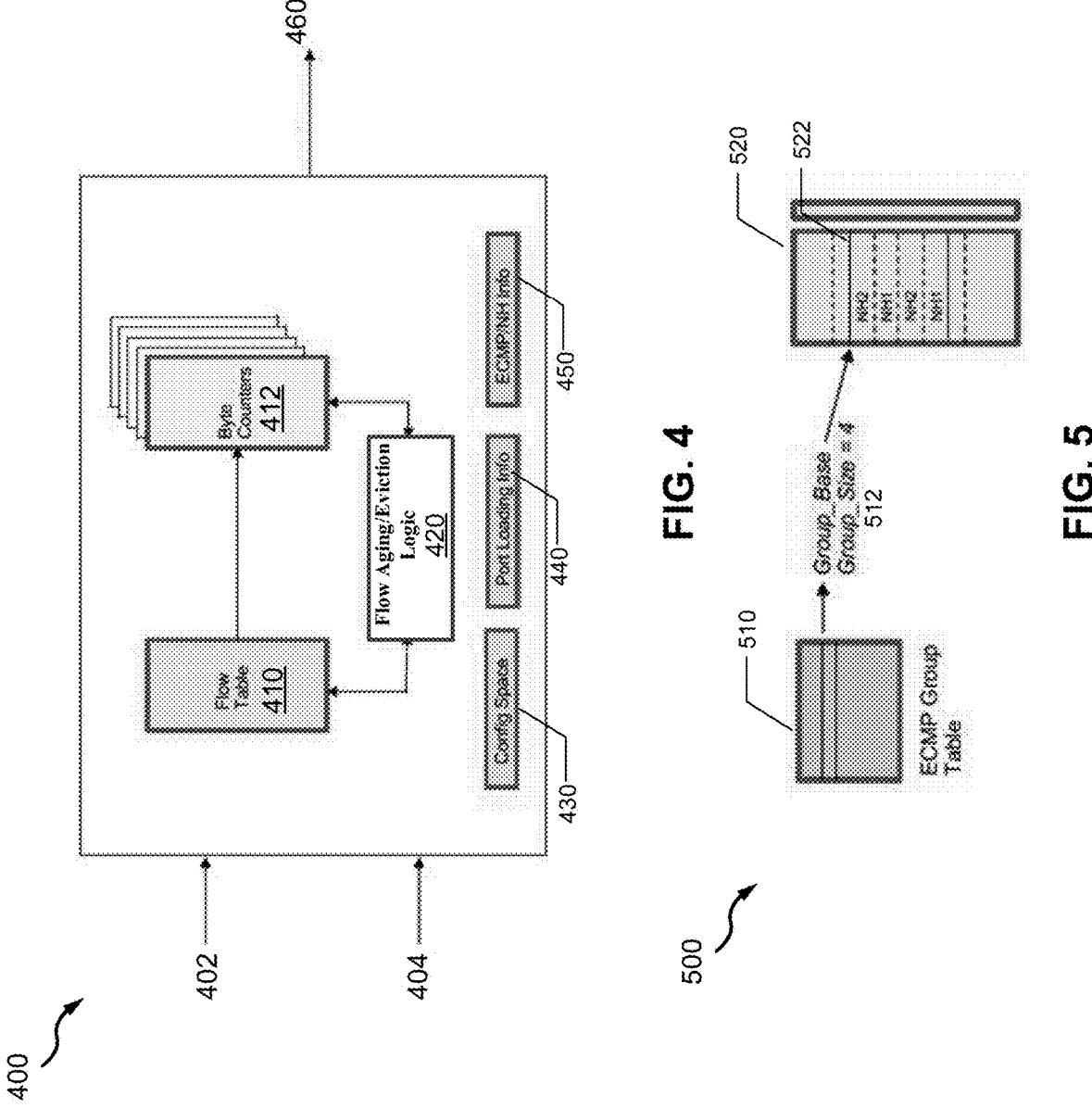
FIG. 4 is a block diagram illustrating an example of an aggregated elephant-flow detection system, according to various aspects of the subject technology.
FIG. 5 is a diagram illustrating an example of a flow management using a load-aware equal-cost multipath (ECMP) mapping.

FIG. 4 is a block diagram illustrating an example of an aggregated elephant-flow detection system 400, according to various aspects of the subject technology. The aggregated elephant-flow detection system 400 (hereinafter, system 400) is an example implementation of the aggregated elephant-flow detection system 300 of FIG. 3. The system 400 includes a flow table 410, a number of byte counters 412 and a flow-aging and/or eviction logic 420. The system 400 may further use a configuration (config) space 430, port loading information (info) 440 and a load-aware ECMP structure and/or next hop (NH) info 450. The system 400 receives input data 402 and 404 and provides the output 460. The input data 402 may include, but is not limited to, flow information, ingress port, egress port, and a byte count from each pipe (e.g., any of pipe 0, pipe 1, pipe 2 and pipe 3 of FIG. 3). The flow information may also include a count (e.g., five-tuple) of different values corresponding to a transmission control protocol (e.g., a transmission-control protocol/internet protocol (TCP/IP)), a source port address, a destination port address and associated transmission protocol.

The byte count consists of the number of bytes in each data packet at the EOP, which enables elephant flow detection support for any protocol irrespective of whether the data packet lengths are available at SOP. The input data 404 may include, but is not limited to, status of ingress port (e.g., 102 of FIG. 1) and egress port (e.g., 104 of FIG. 1) and/or associated queues and loading information from the MMU (e.g., 130 of FIG. 1) and port interfaces (e.g., 110 and 150 of FIG. 1) from each pipe. The flow information and the aggregated byte counts from all pipes are respectively stored in the flow table 410 and the byte counters 412, and are used by the flow aging/eviction logics 420 to manage the flow by detecting and managing any elephant flow. In some implementations, the flow aging/eviction logic 420 tracks the flows across the chip by comparing per-flow accumulated byte count against configurable byte-count and time-period thresholds to detect elephant flows, reporting the detected elephant flows and supporting aging of the detected elephant flows with configurable intervals. The flow aging/eviction logic 420 is agnostic to flows changing the ingress ports of a given router.

The centralized aggregated elephant flow detection and management logic of the subject technology as implemented by the system 400 includes a number of advantagous features. For example, the detected elephant flows can be reported in order to enable changes to their quality of service by software (S/W), and the detected elephant flows can also be segregated or distributed across the desired paths using load-aware ECMP structure, without changing class of service (COS) of the data packets. The flow detection logic (e.g., the flow aging/eviction logics 420) can be implemented only once, irrespective of the number of pipes on the chip, with a fraction of the cost of today's implementation. The elephant flow-detection and management of the subject technology is agnostic to the flows changing ingress ports on a given router. By the very nature of the implementation, the disclosed elephant flow detection and management is aggregated across all the pipes. The subject elephant-flow detection logic can be configured to begin tracking the flow hash once the corresponding egress port is congested/loaded to a certain threshold level for the duration of a time-interval threshold value.

FIG. 5 is a diagram illustrating an example of a flow management scheme 500 using a load-aware ECMP mapping. The flow management scheme 500 uses an ECMP group table 510 that provides group base and size information 512 to the ECMP members and hit bit table 520. The information 512 identifies a group base 522 and a group size of four, which includes NH2, NH1, NH2 and NH1. A central state machine may consider the instantaneous loading on the ports and/or queues corresponding to a NH, and any biases/weights/vectors programmed for accounting into parameters beyond this hop, before selecting the optimal NH per entry as well as a secondary and tertiary NH. A protection switching logic can be applied to optimally select the secondary and tertiary NH.

Figure 6:
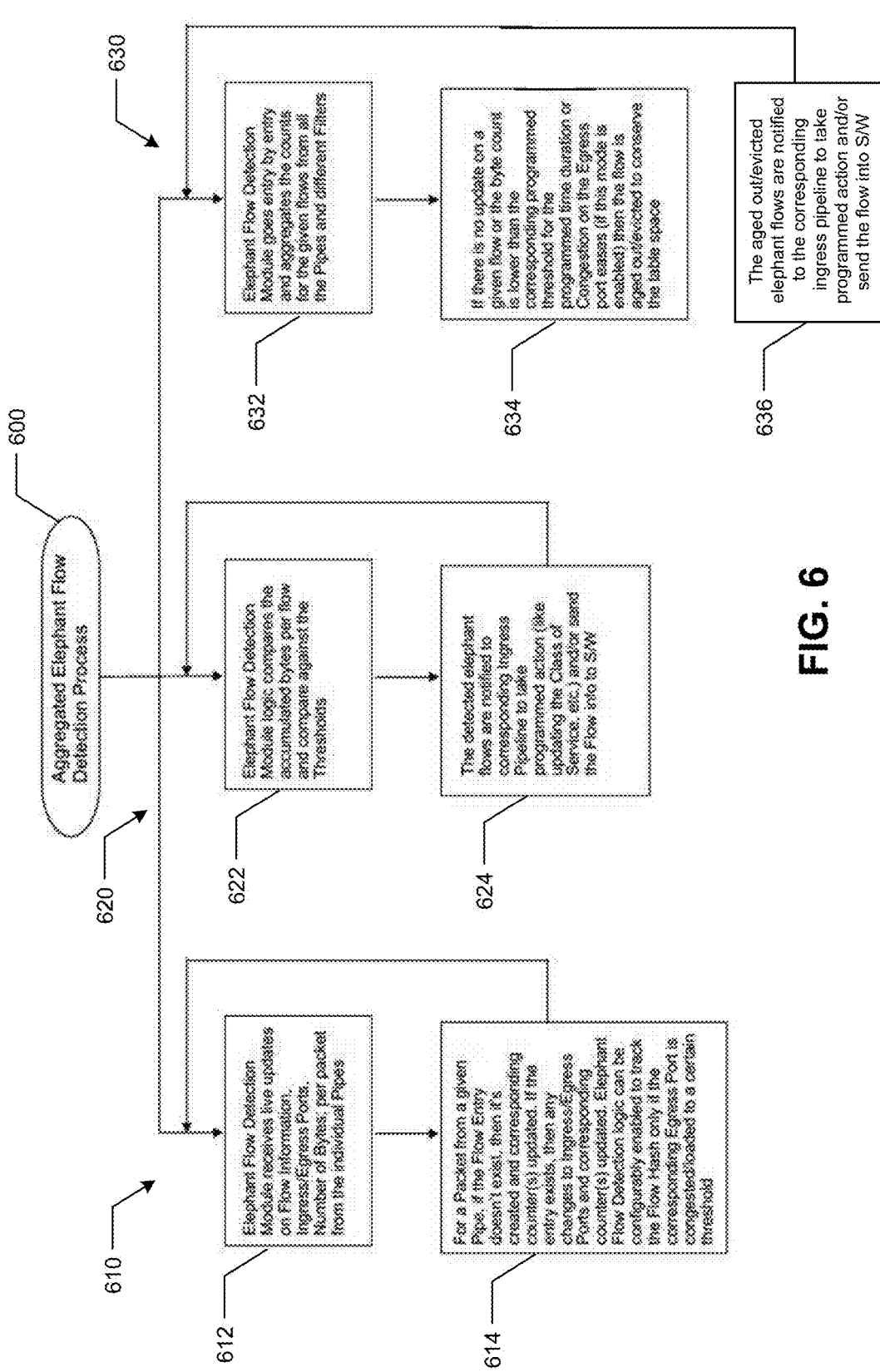
FIG. 6 is a flow diagram illustrating an example of an aggregate elephant flow detection process, in accordance with some aspects of the subject technology.

FIG. 6 is a flow diagram illustrating an example of an aggregate elephant-flow detection process 600, in accordance with some aspects of the subject technology. The aggregate elephant-flow detection process 600 is implemented in three parallel routes 610, 620 and 630. The route 610 includes operation blocks 612 and 614. At operation block 612, the elephant flow-detection logic (e.g., 303 of FIG. 3) receives live updates for each data packet, including the flow information, the ingress port, the egress port and the number of bytes. At operation block 614, the elephant flow-detection logic examines each data packet from a given pipe to determine whether an associated flow entry exist. If not, a flow entry is created and the corresponding counter(s) is updated. If a flow entry exists, then any changes to ingress/egress ports and corresponding counter(s) are updated. Optionally, the elephant flow detection logic (e.g., 420 of FIG. 4) can be configurably enabled to track the flow hash only if the corresponding egress port is congested/loaded to a certain threshold.

The route 620 includes operation blocks 622 and 624. At operation block 622, the elephant flow-detection logic compares the accumulated byte count, per flow, against configurable byte-count and time-period thresholds. Next, at operation block 624, a corresponding ingress pipeline is notified of the detected elephant flows so that it may take programmed action (such as updating the class of service, etc.) and/or send the flow information to S/W. In some implementations, the byte counts for given flows from all pipes and different filters are aggregated.

The route 630 includes operation blocks 632 and 634. At operation block 632, the elephant flow detection logic goes entry by entry and aggregates the counts for the given flows from all the pipes and different filters. At operation block 634, if there is no update on a given flow or the byte count is lower than the corresponding programmed threshold for the programmed time duration or congestion on the egress port eases (if this mode is enabled), then the flow is aged out/evicted to conserve the table space. At operation block 636, corresponding ingress pipelines are notified of the aged out or evicted elephant flows to take programmed action and/or send the flow into software, then the control is passed to operation block 632. In some implementations, an independent pipe can be configured to automatically increment or decrement a priority level of data packets in a detected elephant flow.

FIG. 7 is a flow diagram illustrating an example of an elephant-flow management process 700, in accordance with some aspects of the subject technology. The aggregate elephant-flow management process 700 starts at operation block 710, where the elephant flow-detection logic already has the information on the elephant flows and the corresponding flow hash. The elephant flow-detection logic collects additional information on the ECMP group size and corresponding next hops. Next, at operation block 720, the elephant flow-detection logic uses the information (on the elephant flows, the corresponding flow hash and the additional information on the ECMP group size and corresponding next hops) to automatically derive a desired destination port (and in turn, a next hop) to segregate or distribute the elephant flows (if configurably enabled to do so). The desired destination port corresponds to the location derived by the elephant flow hash ECMP group size.

Figure 8:
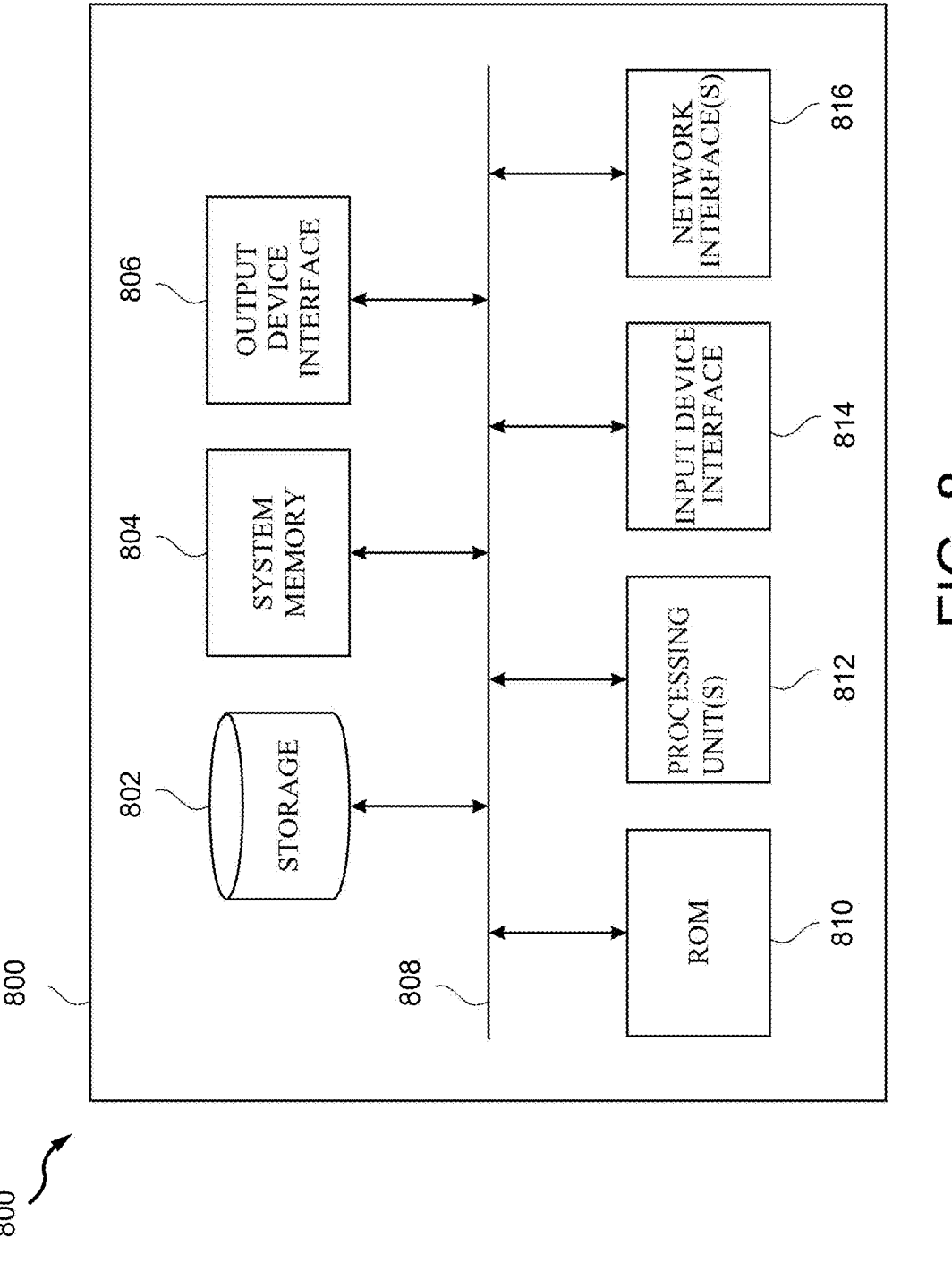
FIG. 8 is an electronic system within which some aspects of the subject technology may be implemented.

FIG. 8 is an electronic system 800 within which some aspects of the subject technology may be implemented. The electronic system 800 can be, and/or can be a part of, the network switch of a data center or an enterprise network. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations. In one or more aspects, the one or more processing unit(s) 812 may represent the elephant-flow detection and management logic 302 of FIG. 3 and be used to implement the processes of FIGS. 6 and/or 7.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a nonvolatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device such as a floppy disk, flash drive and its corresponding disk drive) may be used as the permanent storage device 802. Similar to the permanent storage device 802, the system memory 804 may be a read-and-write memory device. However, unlike the permanent storage device 802, the system memory 804 may be a volatile read-and-write memory, such as random access memory (RAM). The system memory 804 may store any of the instructions and data that one or more processing unit(s) 812 may need at runtime. In one or more implementations, the processes of the subject disclosure are stored in the system memory 804, the permanent storage device 802 and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display a light emitting diode display, an organic light emitting diode display, a flexible display, a flat panel display, a solid state display, a projector or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech or tactile input.

Finally, as shown in FIG. 8, the bus 808 also couples the electronic system 800 to one or more networks and/or to one or more network nodes, through the one or more network interface(s) 816. In this manner, the electronic system 800 can be a part of a network of computers (such as a local area network, a wide area network), an intranet, or a network of networks, such as the internet). Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be nontransitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG and Millipede memory.

Further, the computer-readable storage medium can include any nonsemiconductor memory, such as optical disk storage, magnetic disk storage, magnetic tape, other magnetic storage devices or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections or any combination thereof.

Instructions can be directly executable or can be used to develop executable instructions. For example, instructions can be realized as executable or nonexecutable machine code or as instructions in a high-level language that can be compiled to produce executable or nonexecutable machine code. Further, instructions also can be realized as or can include data. Computer-executable instructions also can be organized in any format, including routines, subroutines, programs, data structures, objects, modules, applications, applets and functions, etc. As recognized by those of skill in the art, details including, but not limited to, the number, structure, sequence, and organization of instructions can vary significantly without varying the underlying logic, function, processing and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods and algorithms described herein may be implemented as electronic hardware, computer software or combinations of both. To illustrate this interchangeability of hardware and software, various illustrative blocks, modules, elements, components, methods and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology. Further, various functional blocks need not be connected directly (even though, for convenience, they are illustrated that way in the figures).

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B or only C; any combination of A, B and C; and/or at least one of each of A, B and C.

The predicate words "configured to," "operable to" and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as "an aspect," "the aspect," "another aspect," "some aspects," "one or more aspects," "an implementation," "the implementation," "another implementation," "some implementations," "one or more implementations," "an embodiment," "the embodiment," "another embodiment," "some embodiments," "one or more embodiments," "a configuration," "the configuration," "another configuration," "some configurations," "one or more configurations," "the subject technology," "the disclosure," "the present disclosure" and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have" or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A semiconductor chip for implementing aggregated flow detection and management, the semiconductor chip comprising:
a plurality of pipes, each pipe having one or more ports, the one or more ports being configured to receive data packets; and
a circuit coupled to the plurality of pipes and configured to detect a large flow across the plurality of pipes, wherein the circuit comprises a flow table and a byte counter, wherein the circuit is configured to detect the large flow in response to an aggregated count of bytes, accumulated by the byte counter, that is aggregated across the plurality of pipes, wherein the aggregated count of bytes is stored in the flow table, and wherein the aggregated count of bytes is aggregated per flow of each pipe of the plurality of pipes such that the large flow is detected across the plurality of pipes.

2. The semiconductor chip of claim 1, wherein the circuit is configured to receive, for each data packet of the data packets, a flow information, an ingress port, an egress port and a count of bytes in each data packet of the data packets, the flow information being stored in the flow table.

3. The semiconductor chip of claim 2, wherein the flow information comprises a count of different values corresponding to a transmission control protocol, a source port address, a destination port address and an associated transmission protocol.

4. The semiconductor chip of claim 2, wherein the count of the bytes in each data packet is derived from an end-of-packet (EOP) and is used to enable flow-detection support associated with a transmission protocol, irrespective of availability of data packet lengths in header bytes of the transmission protocol.

5. The semiconductor chip of claim 1, wherein the circuit further comprises a flow-aging logic implemented on the semiconductor chip, wherein a single circuit for the flow-aging logic is provided for the plurality of pipes on the semiconductor chip.

6. The semiconductor chip of claim 5, wherein the circuit is configured to track flows across the semiconductor chip to detect the large flow.

7. The semiconductor chip of claim 6, wherein the circuit is configured to track the flows across the semiconductor chip by comparing a per-flow accumulated byte count against configurable byte-count and time-period thresholds to detect the large flow, the large flow being an elephant flow.

8. The semiconductor chip of claim 7, wherein the large flow is a large continuous flow, wherein the circuit is further configured to report the large continuous flow and support aging of the large continuous flow within a configurable interval, wherein the flow-aging logic is configured to evict a flow if there is no update on the flow, the per-flow accumulated byte count is lower than a corresponding programmed threshold for a programmed time duration, or a traffic congestion on an egress port eases.

9. The semiconductor chip of claim 7, wherein the circuit is agnostic to an elephant flow changing ingress ports of a given router.

10. The semiconductor chip of claim 1, wherein each pipe of the plurality of pipes is configured to provide a flow hash calculated on flow information.

11. The semiconductor chip of claim 10, wherein the circuit is configured to track the flow hash if a corresponding egress port is congested and/or loaded to a certain threshold for a predefined time interval.

12. The semiconductor chip of claim 10, wherein the flow table comprises a load-aware equal-cost multipath (ECMP) group table including group base and size information.

13. A method of detection and management of an aggre-gated flow, the method comprising:

configuring a pipe of a plurality of pipes disposed on a semiconductor chip to receive a data packet from a port of a plurality of ports of the semiconductor chip;

receiving, by a circuit on the semiconductor chip, for the data packet, live updates on flow information from the plurality of ports; and detecting, by the circuit, a large flow across the plurality of pipes based on at least the flow information, the flow information comprising an aggregated byte count pro-vided by a byte counter, wherein the aggregated byte count is aggregated per flow of each pipe of the plurality of pipes such that the large flow is detected across the plurality of pipes.

14. The method of claim 13, further comprising config-uring the circuit to receive the live updates regarding an ingress port, an egress port and a count of bytes in the data packet.

15. The method of claim 14, further comprising config-uring the circuit to:

derive the count of the bytes in the data packet from an EOP, and enable detection support for a transmission protocol irre-spective of availability of data packet lengths.

16. The method of claim 13, further comprising config-uring the circuit to:

examine each data packet from a given pipe to determine whether an associated flow entry exists, and create and update a corresponding counter when the associated flow entry does not exist.

17. The method of claim 16, further comprising config-uring the circuit to:

update changes to ingress ports and/or egress ports and corresponding counters, when the associated flow entry exists, compare an accumulated byte count, per flow, against configurable byte-count and time-period thresholds, notify a corresponding ingress pipeline to take a pro-grammed action or send the flow information to soft-ware, aggregate byte counts for given flows from the plurality of pipes and different filters; and evict a flow if there is no update on the flow or the aggregated byte count is lower than a corresponding programmed threshold for a programmed time duration or traffic congestion on an egress port eases, wherein the large flow comprises a large continuous flow.

18. The method of claim 17, further comprising config-uring the circuit to:

collect additional information on an equal-cost multipath (ECMP) group size and corresponding next hops when the flow information and a corresponding flow hash exists;

use the flow information and the corresponding flow hash to automatically derive a desired destination to segre-gate or distribute the large flow; and notify, in response to evicting the flow, a corresponding ingress port to perform at least one of taking the programmed action or sending an evicted flow into the software.

19. A system comprising:

memory; and one or more processors coupled to the memory and configured to execute instructions to perform opera-tions comprising:

receiving, by a pipe of a plurality of pipes disposed on a semiconductor chip, data packets from a plurality of ports of the semiconductor chip;

receiving, by the one or more processors, live updates on flow information regarding the data packets from the plurality of ports; and detecting large flow across the plurality of ports based at least on the flow information, wherein the flow information is stored in a table coupled to a byte counter, wherein the table includes an aggregated count of bytes that is aggregated per flow of each pipe of the plurality of pipes such that the large flow is detected across the plurality of pipes.

20. The system of claim 19, wherein the operations further comprise:

tracking a flow hash when data traffic congestion occurs at a corresponding egress port;

notifying a corresponding pipe to record an entire flow information corresponding to the flow hash when the large flow is detected;

configuring a separate pipe to automatically increment or decrement a priority level of data packets in a detected elephant flow;

causing the corresponding pipe to report the detected elephant flow to software using first-in-first-out (FIFO) direct memory access (DMA); and leveraging the flow hash to segregate or distribute the detected elephant flow across a desired destination port or a selected set of destination ports using a load-aware equal-cost multipath (ECMP) structure.

21. The semiconductor chip of claim 1, wherein the large flow consumes more than one percent of a total bandwidth for a network link communicably coupled with the semi-conductor chip.

22. The method of claim 13, wherein the large flow consumes more than one percent of a total bandwidth for a network link communicably coupled with the semiconduc-tor chip.

23. The system of claim 19, wherein the large flow consumes more than one percent of a total bandwidth for a network link communicably coupled with the semiconductor chip.

* * * * *